(12) United States Patent
Bak (10) Patent No.: US 11,314,523 B2
(45) Date of Patent: Apr. 26, 2022

(54) MASTER BOOT RECORD (MBR)/GLOBAL UNIQUE IDENTIFER (GUID) PARTITION TABLE (GPT) HYBRID DISK THAT INCLUDES GPT BOOTSTRAP CODE

(71) Applicant: WAYNE INC., Incheon (KR)

(72) Inventor: Seongbin Bak, Incheon (KR)

(73) Assignee: WAYNE INC., Incheon (KR)

( * ) Notice: Subject to any disclaimer, the term of this patent is extended or adjusted under 35 U.S.C. 154(b) by 150 days.

(21) Appl. No.: 16/959,389

(22) PCT Filed: Oct. 18, 2018

(86) PCT No.: PCT/KR2018/012321
§ 371 (c)(1),
(2) Date: Jun. 30, 2020

(87) PCT Pub. No.: WO2019/135471
PCT Pub. Date: Jul. 11, 2019

(65) Prior Publication Data
US 2021/0064386 A1  Mar. 4, 2021

(30) Foreign Application Priority Data

Jan. 5, 2018  (KR) .................. 10-2018-0001872

(51) Int. Cl.
*G06F 9/4401* (2018.01)
*G06F 3/06* (2006.01)
*G06F 9/50* (2006.01)

(52) U.S. Cl.
CPC .......... *G06F 9/4408* (2013.01); *G06F 3/0607* (2013.01); *G06F 3/0644* (2013.01); *G06F 3/0679* (2013.01); *G06F 9/5061* (2013.01)

(58) Field of Classification Search
CPC .... G06F 9/4408; G06F 3/0607; G06F 3/0644; G06F 3/0679; G06F 9/5061
See application file for complete search history.

(56) References Cited

U.S. PATENT DOCUMENTS 6,978,363 B2    12/2005 Larvoire ..................... 713/1
10,193,693 B2 *  1/2019 Tsuji ................ G06F 12/0246
(Continued)

FOREIGN PATENT DOCUMENTS

| KR | 10-2010-0058583 A | 6/2010 |
| KR | 10-2013-0059089 A | 6/2013 |
| KR | 10-2016-0116574 A | 10/2016 |

*Primary Examiner* — Tammara R Peyton
(74) *Attorney, Agent, or Firm* — Stein IP, LLC (57) ABSTRACT

The present invention relates to a booting disk including a master boot record (MBR) stored in a first region and a globally unique identifier (GUID) partition table (GPT) stored in a second region, wherein the booting disk has a hybrid MBR partition structure in which an MBR partition used by the MBR and a GPT partition used by the GPT are mixed. The GPT partition may include an operating system (OS) partition configured to store an OS and a GPT storage partition configured to store data, the MBR partition may include a GPT protective partition configured to protect the GPT partition and an MBR storage partition configured to store data, the GPT storage partition and the MBR storage partition may be the same the same starting address and size, a starting address of the GPT protective partition may be a logical block addressing (LBA) #1 of the booting disk, and a partition size thereof is zero.

11 Claims, 7 Drawing Sheets

(56) References Cited

U.S. PATENT DOCUMENTS 10,528,116 B2 * 1/2020 Murphy ................ G06F 1/3206
2006/0020780 A1 1/2006 Hobson ............................ 713/2

* cited by examiner

| 121 | 1st Partition Entry | 00 FE FF FF <u>07</u> FE FF FF 42 50 23 00 00 80 00 00 |
| --- | --- | --- |
| 122 | 2nd Partition Entry | 00 00 02 00 <u>EE</u> FE FF FF <u>01 00 00 00 00 00 00 00</u> |
| 123 | 3rd Partition Entry | 00 00 00 00 00 00 00 00 00 00 00 00 00 00 00 00 |
| 124 | 4th Partition Entry | 00 00 00 00 00 00 00 00 00 00 00 00 00 00 00 00 |

| 121A | 1st Partition Entry | 00 FE FF FF <u>07</u> FE FF FF 42 00 23 00 00 80 00 00 |
| --- | --- | --- |
| 122A | 2nd Partition Entry | 00 FE FF FF <u>07</u> FE FF FF 42 50 23 00 00 80 00 00 |
| 123A | 3rd Partition Entry | 00 00 02 00 <u>EE</u> FE FF FF 99 99 00 00 <u>00 00 00 00</u> |
| 124A | 4th Partition Entry | 00 00 02 00 <u>EE</u> FE FF FF <u>01 00</u> 00 00 00 00 00 00 |

MASTER BOOT RECORD (MBR)/GLOBAL UNIQUE IDENTIFER (GUID) PARTITION TABLE (GPT) HYBRID DISK THAT INCLUDES GPT BOOTSTRAP CODE

CROSS-REFERENCE TO RELATED APPLICATIONS

This application is a national stage of International Application No. PCT/KR2018/012321, filed Oct. 18, 2018, which claims the benefit of Korean Application No. 10-2018-0001872, filed Jan. 5, 2018, in the Korean Intellectual Property Office, the disclosures of which are incorporated herein by reference.

BACKGROUND

1. Technical Field

The present invention relates to a booting disk supporting a file storage function, and more particularly, to a booting disk supporting operating system (OS) booting by Basic Input/Output System (BIOS) firmware and Unified Extensible Firmware Interface (UEFI) firmware and supporting a file storage function that allows the booting disk to be recognized as a storage medium and to store a file thereon when the booting disk is connected to a computing device of a certain OS.

2. Description of the Related Art

A booting disk is a removable storage medium for booting an operating system (OS) or a utility program. Conventionally, the bootable disk is usually read-only. However, as storage capacity of removable storage medium increases, free space remaining after storing an OS is gradually increasing. In addition, recently, due to using various computing devices or complicated work environments, it is necessary for the computing devices to boot with various OSs. Therefore, a demand for a removable disk capable of providing both a boot function and a file storage function has emerged.

Accordingly, a removable storage device having an OS function and a file storage function has been proposed in Korean Patent Registration No. 10-1692015. According to the above-described patent, in order to perform the OS function and the file storage function in one removable storage device, the removable storage device is partitioned and an OS is installed in the partitioned removable storage device. Therefore, the removable storage device allows an OS installed on a removable storage device to be used instead of an OS installed on a local hard disk even in a general personal computer (PC), and includes a function for adjusting a space remaining after installing the OS for users to use.

However, in case of the above patent, when the removable storage device is connected to some latest versions (after 2017. 08) of Windows, there is a risk of damage due to exposure of the OS region and it is inconvenient to use as a removable storage due to a partition error.

SUMMARY

Technical Problem

The present invention is directed to a booting disk supporting operating system (OS) booting by Basic Input/Output System (BIOS) firmware and Unified Extensible Firmware Interface (UEFI) firmware and supporting a file storage function that allows the booting disk to be recognized as a storage medium and to store a file thereon when the booting disk is connected to a computer of a Windows operating system.

Solution to Problem

One aspect of the present invention provides a booting disk including a master boot record (MBR) stored in a first region and a globally unique identifier (GUID) partition table (GPT) stored in a second region, wherein the booting disk has a hybrid MBR partition structure in which an MBR partition used by the MBR and a GPT partition used by the GPT are mixed. The GPT partition may include an operating system (OS) partition configured to store an OS and a GPT storage partition configured to store data, the MBR partition may include a GPT protective partition configured to protect the GPT partition and an MBR storage partition configured to store data, the GPT storage partition and the MBR storage partition may have the same starting address and size, a starting address of the GPT protective partition may be a logical block addressing (LBA) #1 of the booting disk, and a partition size thereof may be zero.

The first region may be a region of an LBA #0, which is a first sector, and the second region may be a region ranging from an LBA #1, which is a second sector, to an LBA #k.

The MBR may include a partition table, and the partition table may include two or more partition entries related to the MBR partition.

A logically first partition entry among the partition entries may indicate the MBR storage partition.

Each of the partition entries may have information about a partition type indicating a format of a corresponding partition, and a type of the MBR storage partition may be determined by any one of partition types recognizable by Windows OS.

The MBR partition may further include at least one GPT protective partition with a different starting address.

The GPT storage partition and the MBR storage partition may include a plurality of partitions, and the numbers, locations, and sizes of the partitions may be the same.

The OS partition may include a plurality of partitions, and each of the partitions may store a different OS.

The GPT partition may further include a Unified Extensible Firmware Interface (UEFI) system partition for UEFI firmware-based booting.

The GPT may include a GPT header and a partition table, and the booting disk may further include a backup GPT stored in a third region with the same contents as the GPT.

DETAILED DESCRIPTION OF EMBODIMENTS

While embodiments of the present invention may be modified in various ways and take on various alternative forms, specific embodiments thereof are shown in the drawings and described in detail in this specification. There is no intent to limit the present invention to the particular forms disclosed. On the contrary, the present invention is to cover all modifications, equivalents, and alternatives falling within the spirit and scope of the appended claims.

It should be understood that when an element is referred to as being "connected" or "coupled" to another element, the element may be directly connected or coupled to another element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," and the like).

The terminology used herein is for the purpose of describing particular embodiments only and is not intended to be limiting to the present invention. As used herein, the singular forms "a," "an," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein. The term "and/or" includes any and all combinations of one or more referents.

Hereinafter, embodiments of the present invention will be described in detail in this specification with reference to the accompanying drawings.

Figure 1:
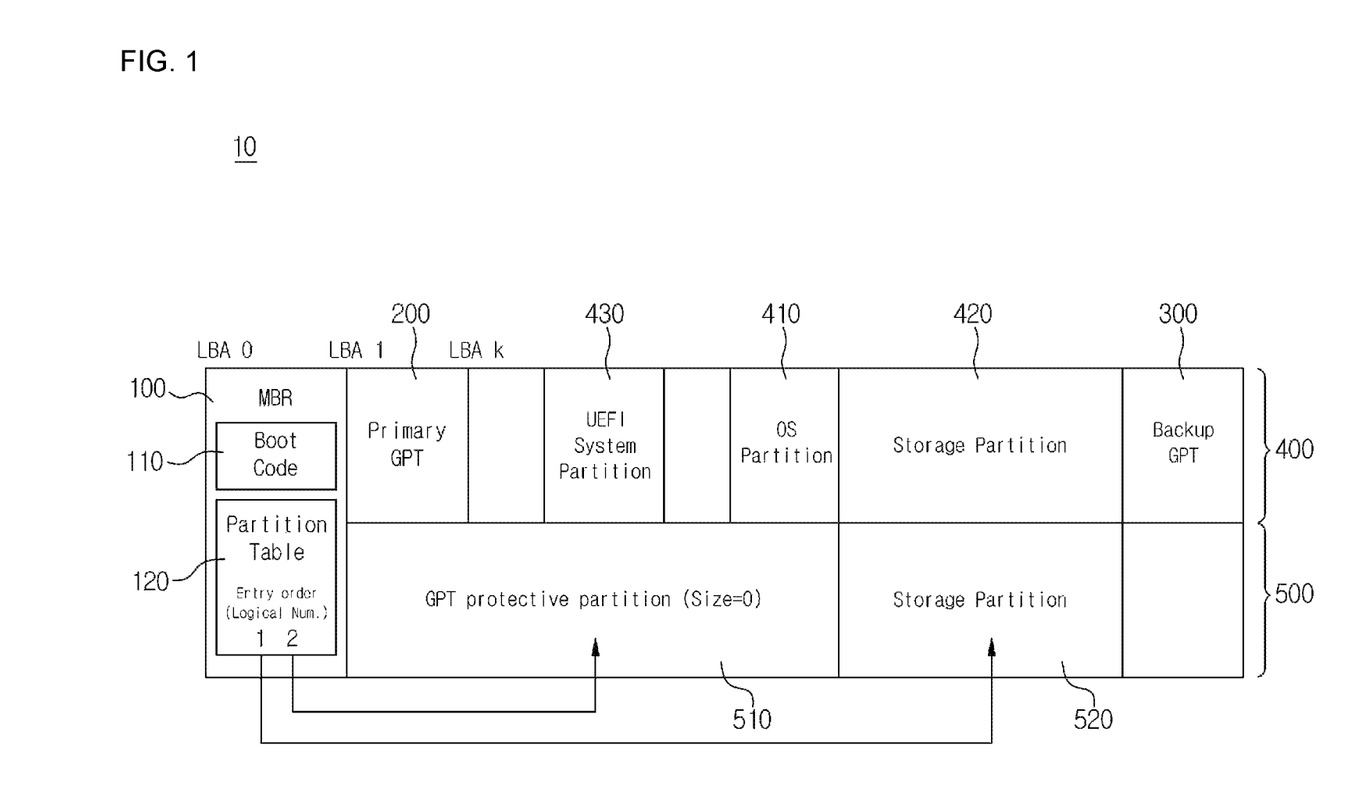
FIG. 1 is a diagram showing a partition structure of a booting disk according to an embodiment of the present invention.
Figure 2:
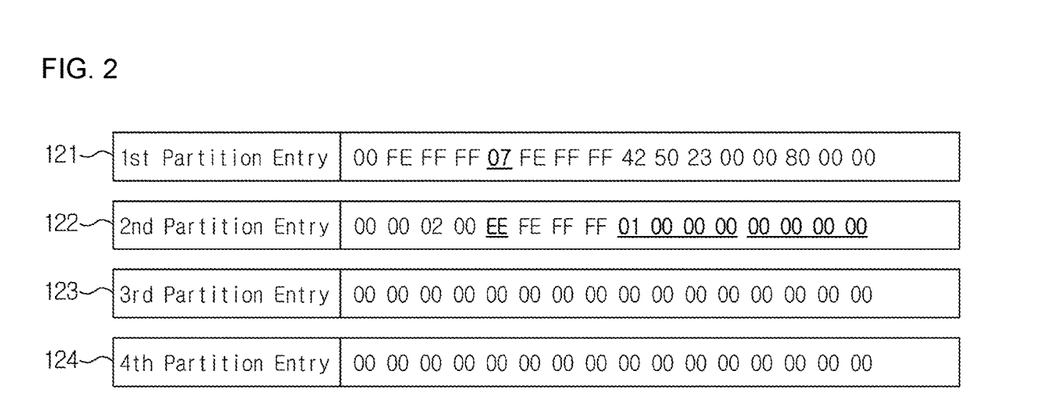
FIG. 2 is a diagram showing an example of a partition table recorded in a master boot record (MBR) of FIG. 1.

FIG. 1 is a diagram showing a partition structure of a booting disk according to an embodiment of the present invention, and FIG. 2 is a diagram showing an example of a partition table recorded in a master boot record (MBR) of FIG. 1.

The booting disk may refer to a storage medium on which an operating system (OS) or a utility program may be booted. In some embodiments, the booting disk may be implemented as a hard disk, a floppy disk, a compact disc read only memory (CD-ROM), a digital video disc (DVD), a Blu-ray disc, a flash memory, a Zip drive, a Jaz drive, a magnetic tape, a Universal Serial Bus (USB) flash drive, or the like, but the present invention is not limited thereto.

Referring to FIGS. 1 and 2, a booting disk 10 includes an MBR 100 and a globally unique identifier (GUID) partition table (hereinafter referred to as a 'GPT') 200, and the booting disk 10 has a hybrid MBR partition structure in which an MBR partition 500 and a GPT partition 400 used by the MBR 100 and the GPT 200, respectively, are mixed.

The MBR 100 may be one partition schema and may have a disk format which is basically used in a Basic Input/Output System (BIOS) of a conventional IBM compatible personal computer (PC). The MBR 100 may be located in a first region of the disk, that is, a logical block addressing (LBA) #0, which is a first sector of 512 bytes.

The MBR 100 may include a boot code 110 including information about booting and a partition table 120 including information about a partition.

The boot code 110 may be a portion of the bootloader and may include a first stage bootloader with a total length of 440 bytes, ranging from 0 bytes to 339 bytes of the first sector.

The boot code 110 may include a code for causing a central processing unit (CPU) to read the GPT 200 and may find a partition in which a second stage bootloader is installed using the GPT 200.

The partition table 120 may be composed of a total of 64 bytes and may include four partition entries 121, 122, 123, and 124 including detailed information about respective partitions as shown in FIG. 2. That is, the MBR partition 500 may be configured with a maximum of four main partitions or three main partitions and one extended partition, on the basis of the partition table 120.

For example, in FIG. 2, a state in which information is recorded in two main partition entries, that is, a first partition entry 121 and a second partition entry 122 among the four partition entries in a Little-endian manner, is shown.

Information about a partition state, a cylinder-head-sector (CHS) address of a first sector of a partition, a partition type, a last CHS address of the partition, a starting LBA address of the partition, and a size of the partition may be sequentially recorded in each partition entry 121, 122, 123, or 124.

The partition state may indicate a state such as a bootable state (0x80), a non-bootable state (0x00), an abnormal state (other), etc. and may be represented by one byte. For example, a value of a partition state of the first partition entry 121 and a value of a partition state of the second partition entry 122 are 0x00, which indicate that the first partition entry 121 and the second partition entry 122 are all non-bootable partitions.

CHS addresses of the first and last sectors of the partition may be values which represent locations at which the partition starts and ends with respect to the beginning of the disk using a CHS address system and may each have a field length of three bytes.

The starting LBA address of the partition may be a value which represents the location at which the partition starts with respect to the beginning of the disk using a LBA address system and may be represented by four bytes. Further, the size of the partition may be information which represents a total number of sectors included in the partition, that is, a total number of sectors of a corresponding partition, and may have a field length of four bytes.

The partition type may be a value which specifies a specific access method used for specifying a file system included in the partition or for accessing the corresponding partition as a flag and may be represented by one byte.

For example, a partition type of the first partition entry 121 is 0x07, which indicates that the partition used by the first partition entry 121 is a partition related to Microsoft (MS), that is, a partition recognizable in Windows. Meanwhile, a type of the partition recognizable in Windows is not limited to 0x07. In some embodiments, the type of the partition recognizable in Windows may be variously set to 0x0B, 0x0C, etc.

Further, a partition type of the second partition entry 122 is 0xEE, which indicates that the partition used by the second partition entry 122 is a partition for GPT protection.

The GPT 200 may have a partition schema different from that of the MBR and have the form of a disk used in an Extensible Firmware Interface (EFI) or a Unified Extensible Firmware Interface (UEFI).

The GPT 200 may be located in a second region, that is, a region ranging from an LBA #1 to an LBA #k, and may include a GPT header and a GPT partition entry.

The GPT header may be located in the LBA #1, which is a second sector, and may record general configuration information about the GPT, such as a signature, revision, first and last usable LBAs for partition, starting LBAs of GPT partition entries, the number of partition entries, a size of partition entry, and the like. The GPT header may use 92 bytes among a total of 512 bytes of the LBA #1, and the remaining region may be recorded as a NULL value.

The GPT partition entry may record 128 pieces of partition information in a region ranging from an LBA #2, which is a third sector, to an LBA #k (e.g., k=33).

One GPT partition entry may use 128 bytes and may include unique information (a partition type GUID) representing a type of a corresponding partition and information such as first and last LBAs of the partition, attribute values (attribute flags) of the partition, a file system name (a partition name), and the like.

Meanwhile, the booting disk 10 may further include a backup GPT 300. The backup GPT 300 may include substantially the same contents as the GPT 200 and may be located in last sectors of the disk.

The GPT partition 400 may be a partition configured according to the GPT 200 and may include an OS partition 410 and a storage partition 420. In addition, the GPT partition 400 may further include a UEFI system partition 430 for UEFI firmware-based booting.

The OS partition 410 may be a region in which an OS is installed, and the booting disk 10 may support booting with an OS stored in a series of processes according to a BIOS or UEFI type.

The storage partition 420 may be a region in which general data other than the OS is stored and may be used as a removable storage by being exposed to a user when the boot disk 10 is connected to a computing device.

The MBR partition 500 may be a partition configured according to the MBR 100 and may include a GPT protective partition 510 and a storage partition 520.

The GPT protective partition 510 prevents the GPT partition from being recognized and the GPT disk from being deleted or changed by an MBR-based system or program.

In some embodiments, the GPT protective partition 510 may correspond to the second partition entry 122 of the MBR partition table 120.

It is necessary to set a location of the GPT protective partition 510 so as to include the LBA #1 (0x000001) at which the GPT 200 is located. If there is no GPT protective partition 510 including the LBA #1, the firmware cannot find the OS installed in the GPT partition 400, and thus the booting may be impossible.

Further, a size of the GPT protective partition 510 may be set to zero (=0x00000000). In this case, the OS booting by the booting disk 10 may be smoothly performed, and when the booting disk 10 is connected to a computing device running on Windows OS, the GPT protective partition 510 may be hidden, thereby preventing the OS from recognizing the GPT protective partition 510.

The storage partition 520 may be a region for storing data. A location (e.g., a starting LBA address) and size of the storage partition 520 may be set to be the same as those of the storage partition 420 of the GPT partition 400, and a type of the partition may be set to be a type recognizable (e.g., 0x70, 0x0B, 0x0C, etc.) in Windows.

According to the MBR partition setting, when the booting disk 10 is connected to the computing device running on Windows OS, only the storage partition is exposed and the OS partition is hidden. Therefore, it is possible to prevent the OS region from being damaged and address a problem in that the booting disk 10 cannot be used as a removable storage medium due to a partition error.

Further, the storage partition 520 may be set so as to correspond to the first partition entry 121, which is a logically first entry, among the partition entries of the MBR partition table 120.

Therefore, even when the Windows OS installed in the computing device recognizes only a logically first partition of the booting disk 10, the booting disk 10 may be used as a removable storage medium.

Figure 3:
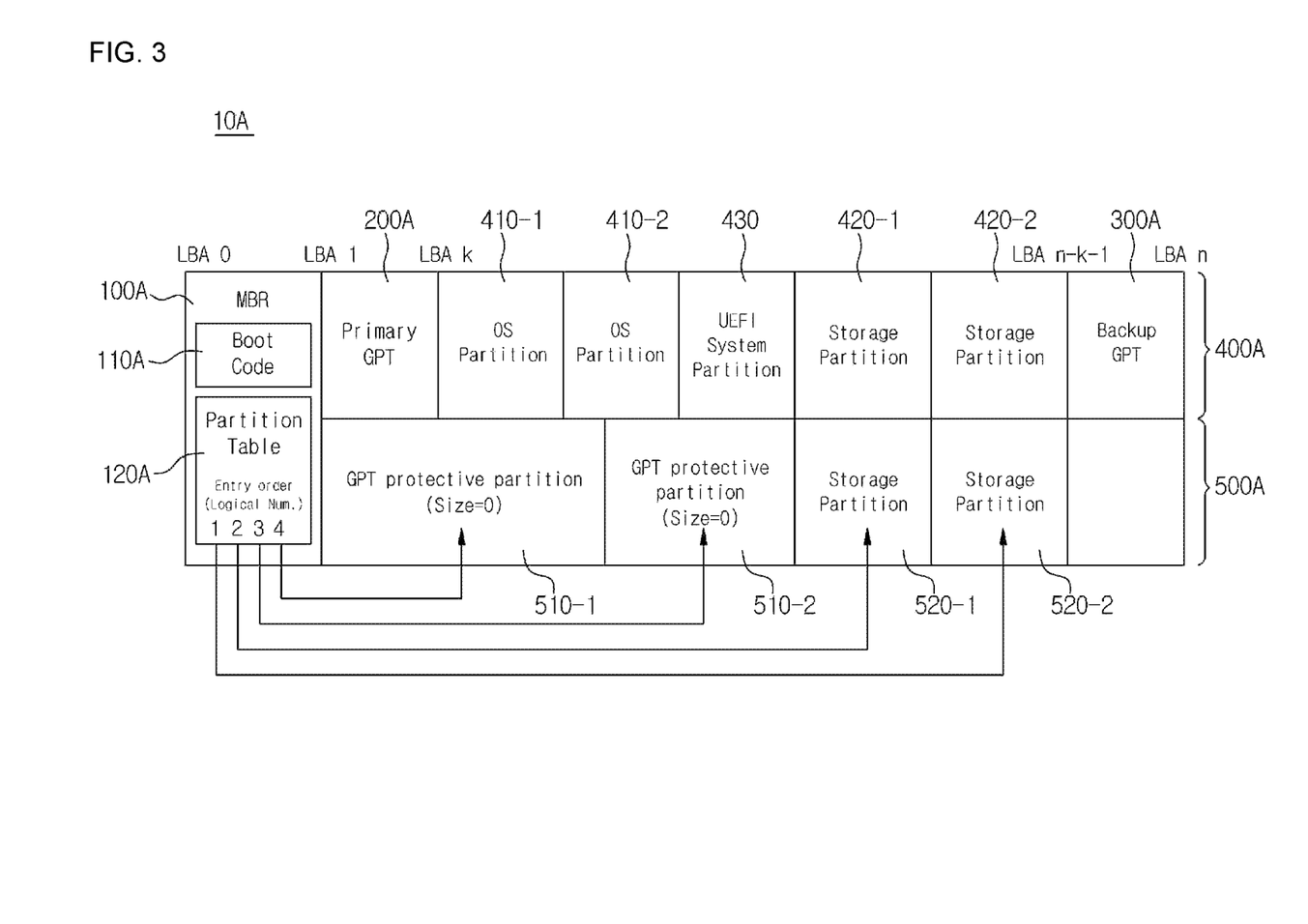
FIG. 3 is a diagram showing a partition structure of a booting disk according to another embodiment of the present invention.
Figure 4:
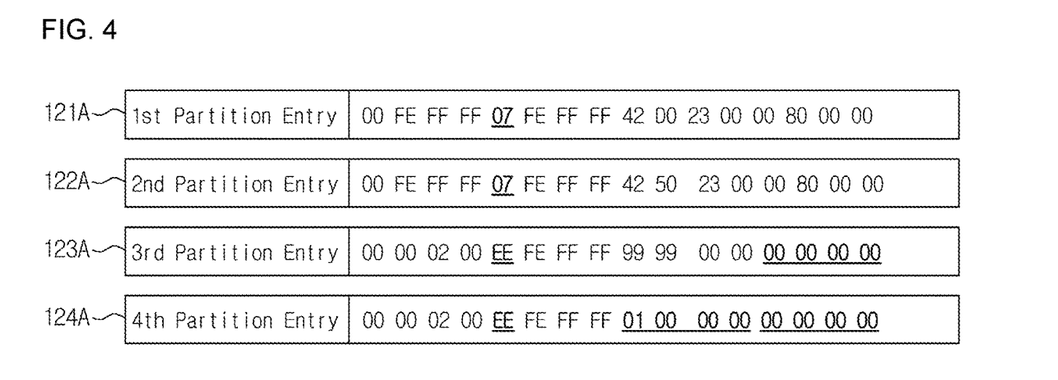
FIG. 4 is a diagram showing an example of a partition table recorded in an MBR of FIG. 3.

FIG. 3 is a diagram showing a partition structure of a booting disk according to another embodiment of the present invention, and FIG. 4 is a diagram showing an example of a partition table recorded in an MBR of FIG. 3.

Since a booting disk 10A shown in FIG. 3 is substantially the same as, or similar to, the boot disk 10 shown in FIG. 1 except for the number of partitions, redundant descriptions thereof will be omitted.

Referring to FIGS. 3 and 4, the booting disk 10A includes an MBR 100A and a GPT 200A and has a hybrid MBR partition structure in which a GPT partition 400A and an MBR partition 500A are mixed.

The GPT partition 400A according to the GPT 200A may include at least one OS partition 410-1 or 410-2 and at least one storage partition 420-1 or 420-2. That is, each of the OS partition and the storage partition may include a plurality of partitions having different locations and sizes.

Different OSs may be installed in a first OS partition 410-1 and a second OS partition 410-2, and the user may attempt to boot selectively with each OS.

The MBR partition 500A according to the MBR 100A may include at least one GPT protective partition 510-1 or 510-2 and at least one storage partition 520-1 or 520-2.

In some embodiments, when the GPT protective partitions 510-1 and 510-2 include a plurality of protective partitions, one GPT protective partition 510-1 among the plurality of protective partitions should be located to include an LBA #1, and sizes of all the GPT protective partitions 510-1 and 510-2 should be zero.

Further, when the storage partitions 520-1 and 520-2 include a plurality of storage partitions, the numbers, locations, and sizes of the storage partitions 520-1 and 520-2 should be set to correspond to those of the storage partitions 420-1 and 420-2.

A partition table 120A may include a total of four partition entries 121A, 122A, 123A, and 124A as shown in FIG. 4. A first partition entry 121A may correspond to a second storage partition 520-2, a second partition entry 122A may correspond to a first storage partition 520-1, a third partition entry 123A may correspond to a second GPT protective partition 510-2, and a fourth partition entry 124A may correspond to a first GPT protective partition 510-1.

Figure 5:
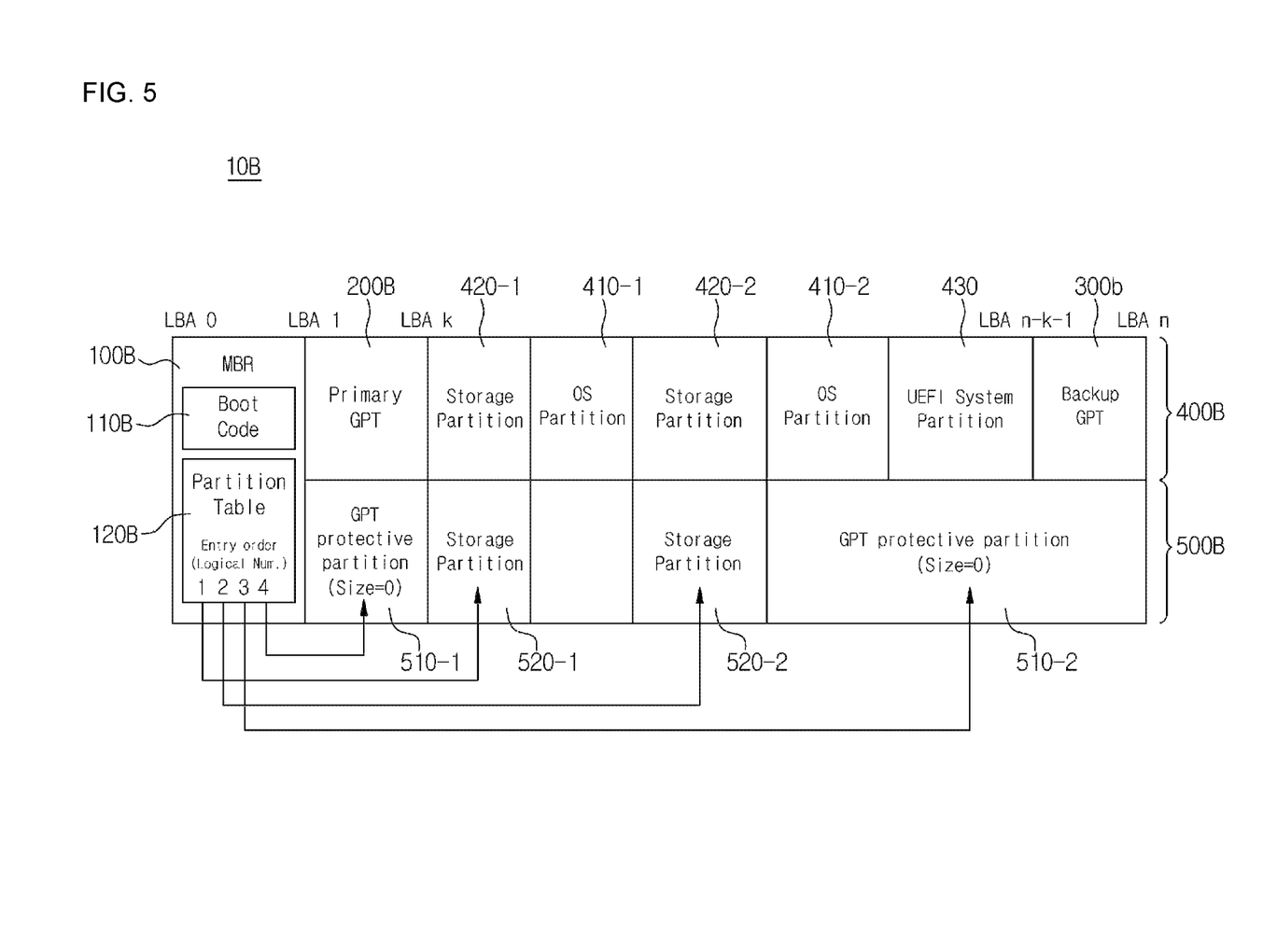
FIG. 5 is a diagram showing a partition structure of a booting disk according to still another embodiment of the present invention.
Figure 6:
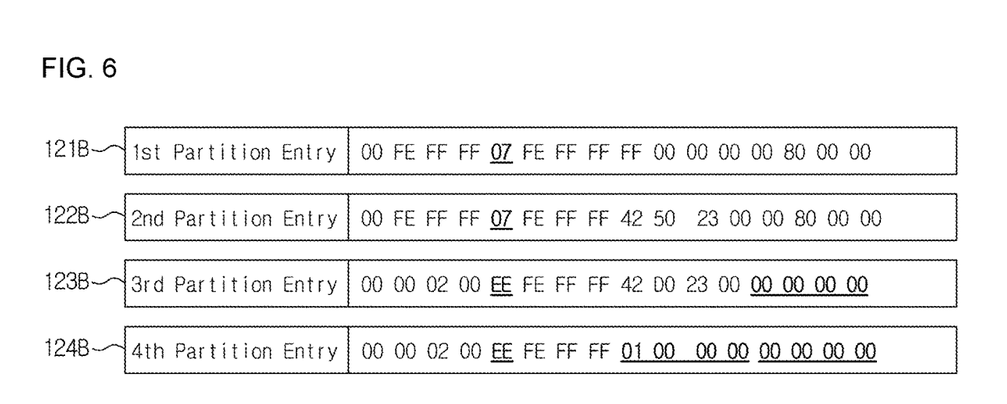
FIG. 6 is a diagram showing an example of a partition table recorded in an MBR of FIG. 5.

FIG. 5 is a diagram showing a partition structure of a booting disk according to still another embodiment of the present invention, and FIG. 6 is a diagram showing an example of a partition table recorded in an MBR of FIG. 5.

Since a booting disk 10B shown in FIG. 5 is substantially the same as, or similar to, the booting disk 10A shown in FIG. 3 except for logical and physical locations of MBR partitions, redundant descriptions thereof will be omitted.

Referring to FIGS. 5 and 6, the booting disk 10B includes an MBR 100B and a GPT 200B and has a hybrid MBR partition structure in which a GPT partition 400B and an MBR partition 500B are mixed.

The GPT partition 400B according to the GPT 200B may include two OS partitions 410-1 and 410-2 and two storage partitions 420-1 and 420-2, and the storage partitions and the OS partitions may be physically and alternately located.

The MBR partition 500B according to the MBR 100B may include two GPT protective partitions and two storage partitions.

A first GPT protective partition 510-1, a first storage partition 520-1, a second storage partition 520-2, and a second GPT protective partition 510-2 may be physically and sequentially located on the MBR partition 500B disk.

On the other hand, in consideration of the correspondence with the partition entries 121B, 122B, 123B, and 124B, a logical partition order may be set to an order of the first storage partition 520-1, the second storage partition 520-2, the second GPT protective partition 510-2, and the first GPT protective partition 510-1.

That is, in the embodiment of the present invention, the physical and logical locations of the MBR partitions need not coincide with each other. However, the GPT protective partition should be located in a physically first partition including an LBA #1, and a logically first partition may be set as a storage partition.

Figure 7:
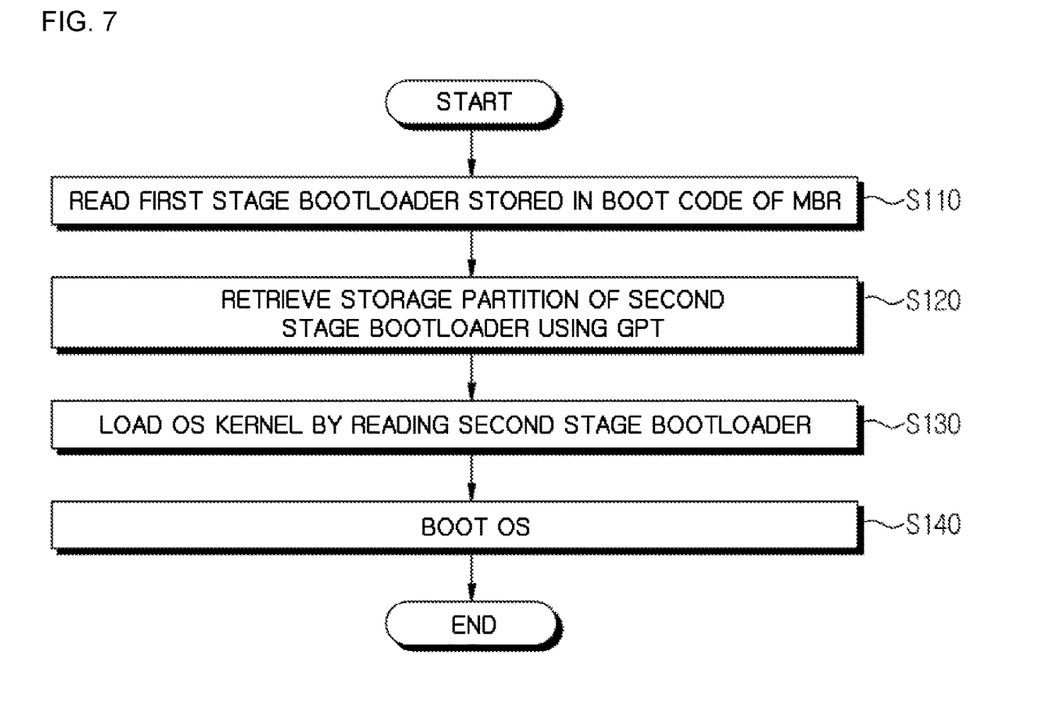
FIG. 7 is a flowchart showing a Basic Input/Output System (BIOS)-based operating system (OS) booting process in a booting disk according to an embodiment of the present invention.

FIG. 7 is a flowchart showing a BIOS-based OS booting process in the booting disk according to the embodiment of the present invention.

Referring to FIGS. 1 and 7, first, the CPU of the computing device may execute a BIOS stored in a read only memory (ROM). The BIOS may perform a power-on self-test (POST) operation and then load the boot code 110 of the MBR 100, which is the first sector of the boot disk, for OS loading (S110). The first stage bootloader, which is a portion of the bootloader for OS booting, is recorded in the boot code 110.

The CPU may read the first stage bootloader and then retrieve a partition in which the second stage bootloader, which is a remainder of an entirety of the bootloaders, is stored, using the GPT 200 (S120). Thereafter, the CPU may read the second stage bootloader at a starting location of the retrieved partition and read an OS kernel according to an instruction of the second stage bootloader and thus may boot the OS stored in the booting disk 10 (S130 and S140).

Figure 8:
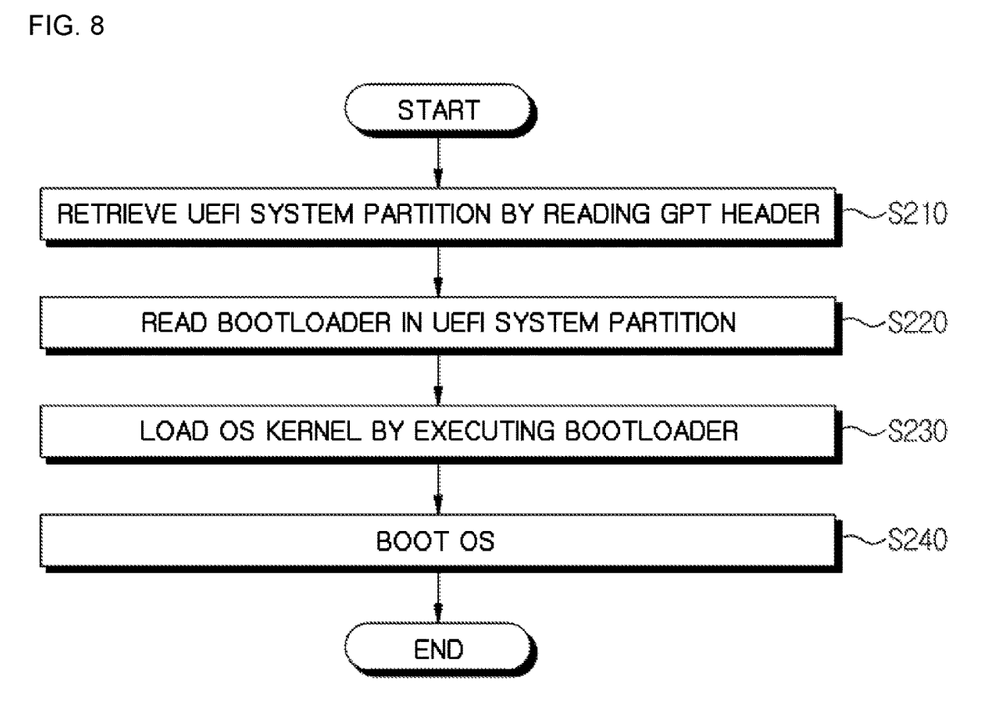
FIG. 8 is a flowchart showing a Unified Extensible Firmware Interface (UEFI)-based OS booting process in a booting disk according to an embodiment of the present invention.

FIG. 8 is a flowchart showing a UEFI-based OS booting process in the booting disk according to the embodiment of the present invention.

Referring to FIGS. 1 and 8, first, the CPU of the computing device may execute a UEFI stored in a ROM. The UEFI may read the GPT header located in the second sector of the booting disk for OS loading (S210).

The CPU may retrieve a location of the UEFI system partition using the GPT partition table (S220). Thereafter, the CPU may read the bootloader stored in the UEFI system partition and read an OS kernel according to an instruction of the bootloader and thus may boot the OS stored in the booting disk 10 (S230 and S240).

Figure 9:
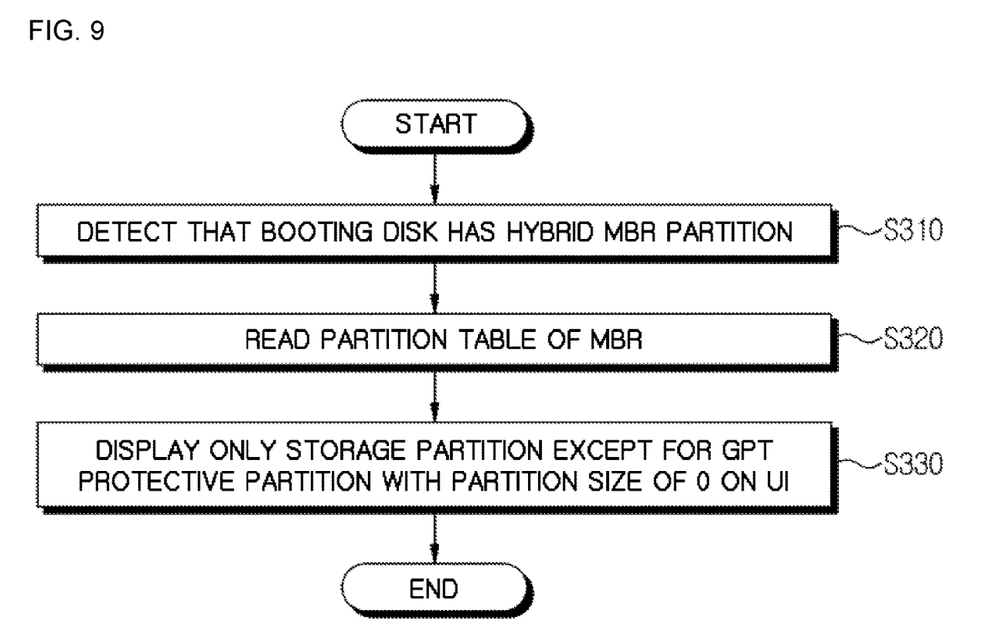
FIG. 9 is a flowchart showing an operation process when a boot disk according to an embodiment of the present invention is connected to a computing device of a Windows OS.

FIG. 9 is a flowchart showing an operation process when the boot disk according to the embodiment of the present invention is connected to a computing device running on Windows OS.

Referring to FIGS. 1 and 9, when the booting disk 10 is connected to the computing device running on the Windows OS, the Windows OS may detect that the booting disk 10 is configured as a hybrid MBR partition in which the MBR partition 500 and the GPT partition 400 are mixed. For example, the Windows OS may determine that the corresponding booting disk 10 is configured as a hybrid MBR partition when there are two or more MBR partition entries and the GPT protective partition 510 is located in the LBA #1.

In this case, the Windows OS may ignore the GPT partition 400 and may read the partition table 120 of the MBR 100. In this case, the Windows OS is intended to display all configured partitions on a user interface (UI). However, the GPT protective partition 510 may be hidden because its size is zero, and only the storage partition 520 may be displayed on the UI.

According to the present invention, a booting disk can be used for OS booting because the OS is mounted therein, and the OS region can be hidden and only a specific storage partition can be exposed when the booting disk is connected to a computing device so that the booting disk can also be used as a removable storage device.

While the present invention has been described with reference to exemplary embodiments illustrated in accompanying drawings, these should be considered in a descriptive sense only, and it will be understood by those skilled in the art that various alterations and equivalent other embodiment may be made. Therefore, the scope of the present invention is defined by the appended claims.

What is claimed is:

1. A booting disk supporting a file storage function, the booting disk comprising a master boot record (MBR) stored in a first region and a globally unique identifier (GUID) partition table (GPT) stored in a second region, wherein the booting disk has a hybrid MBR partition structure in which an MBR partition used by the MBR and a GPT partition used by the GPT are mixed, wherein the GPT partition includes an operating system (OS) partition configured to store an OS and a GPT storage partition configured to store data, the MBR partition includes a GPT protective partition configured to protect the GPT partition and an MBR storage partition configured to store data, and a starting address of the GPT protective partition is a logical block addressing (LBA) #1 of the booting disk and a partition size thereof is zero.

2. The booting disk of claim 1, wherein:
the first region is a region of an LBA #0, which is a first sector; and the second region is a region ranging from an LBA #1, which is a second sector, to an LBA #k.

3. The booting disk of claim 1, wherein the MBR includes a partition table, wherein the partition table includes two or more partition entries related to the MBR partition.

4. The booting disk of claim 3, wherein a logically first partition entry among the partition entries indicates the MBR storage partition.

5. The booting disk of claim 3, wherein:
each of the partition entries has information about a partition type indicating a format of a corresponding partition; and
a type of the MBR storage partition is determined by any one of partition types recognizable by Windows OS.

6. The booting disk of claim 1, wherein the MBR partition further includes at least one GPT protective partition with a different starting address.

7. The booting disk of claim 1, wherein the GPT storage partition and the MBR storage partition include a plurality of partitions, and the numbers, locations, and sizes of the partitions are the same.

8. The booting disk of claim 1, wherein the OS partition includes a plurality of partitions and each of the partitions stores a different OS.

9. The booting disk of claim 1, wherein the GPT partition further includes a Unified Extensible Firmware Interface (UEFI) system partition for UEFI firmware-based booting.

10. The booting disk of claim 1, wherein the GPT includes a GPT header and a partition table, and the booting disk further includes a backup GPT stored in a third region with the same contents as the GPT.

11. The booting disk of claim 1, wherein the GPT storage partition and the MBR storage partition have the same starting address and size.

* * * * *

UNITED STATES PATENT AND TRADEMARK OFFICE
CERTIFICATE OF CORRECTION

| | |
|---|---|
| PATENT NO. | : 11,314,523 B2 |
| APPLICATION NO. | : 16/959389 |
| DATED | : April 26, 2022 |
| INVENTOR(S) | : Seongbin Bak |

It is certified that error appears in the above-identified patent and that said Letters Patent is hereby corrected as shown below:

On the Title Page

Item (54) and in the Specification, Column 1, Lines 1-4, in the title, please correct IDENTIFER to IDENTIFIER.

Signed and Sealed this
Sixteenth Day of August, 2022

*Katherine Kelly Vidal*

Katherine Kelly Vidal
*Director of the United States Patent and Trademark Office*